Figure 1:
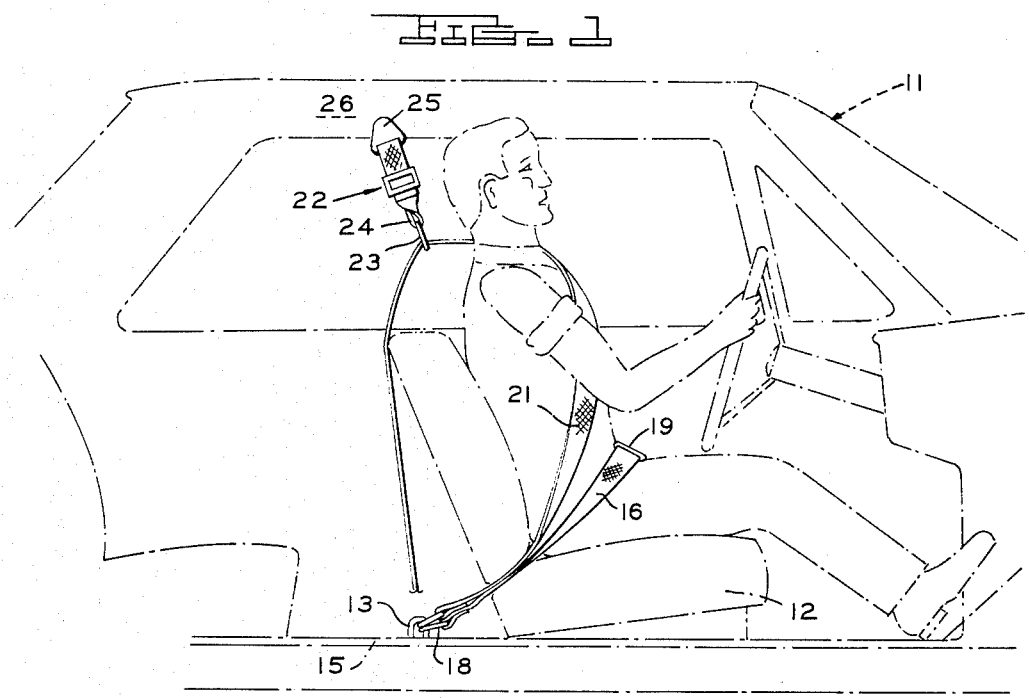

Feb. 22, 1966  R. J. BERTON ETAL  3,236,540

SAFETY HARNESS

Filed May 13, 1964

ROGER J. BERTON
ROBERT H. FREDERICK
INVENTORS

BY John R. Faulkner
John J. Roethel
ATTORNEYS

United States Patent Office 3,236,540
Patented Feb. 22, 1966

3,236,540
SAFETY HARNESS
Roger J. Berton, Dearborn Heights, and Robert H. Fredericks, Southfield, Mich., assignors to Ford Motor Company, Dearborn, Mich., a corporation of Delaware
Filed May 13, 1964, Ser. No. 367,043
1 Claim. (Cl. 280—150)

This invention relates to belt or harness systems used in automotive vehicles to restrain the occupants against the effects of rapid deceleration, such as occurs when a vehicle is involved in a collision or is upset.

For the past ten years, lap-type seat belts have been used as an occupant restraining device for passenger vehicles manufactured in the United States. Various full-scale tests conducted by the automobile manufacturers and others have demonstrated the effectiveness of restraining a vehicle occupant through a lap-type seat belt which controls the displacement of the pelvic region of the occupant's body.

Following the adoption of seat belts in the United States, various configurations of restraining harnesses were developed in Europe. These restraining harnesses were designed to provide upper body as well as pelvic restraint because the generally smaller cars used in Europe permitted only limited occupant jackknifing clearance. Most of the current harness designs employ a lap-type seat strap combined with a single shoulder strap that passes diagonally across the chest. When a common connector is used at the junction of the lap and shoulder straps, the harness design is referred to as a 3-point system. In some designs, a single length of webbing reverses direction at this connector to form the lap and shoulder strap elements of the harness. The harness is called a slip-joint type if the common strap connector is free to slip on the webbing.

A series of tests have been conducted to evaluate the harness systems under the same simulated collision conditions used to determine the dynamic performance of lap-type seat belts. The loads developed in the harness elements were measured and occupant kinematics were studied by analysis of high speed motion picture film. Restraint applied by the shoulder straps limited upper torso jackknifing, but some of the harness designs did not adequately restrain the lower torsos of the dummy passengers. The harnesses were found to impose restraining loads on the body that produced structural damage in some of the dummies.

Accordingly, it is an object of the present invention to provide a harness and lap-belt system which more safely and completely provides the necessary body restraint to protect the vehicle occupants. The system embodying the present invention basically comprises a lap strap which is independent of the shoulder strap.

Figure 2:
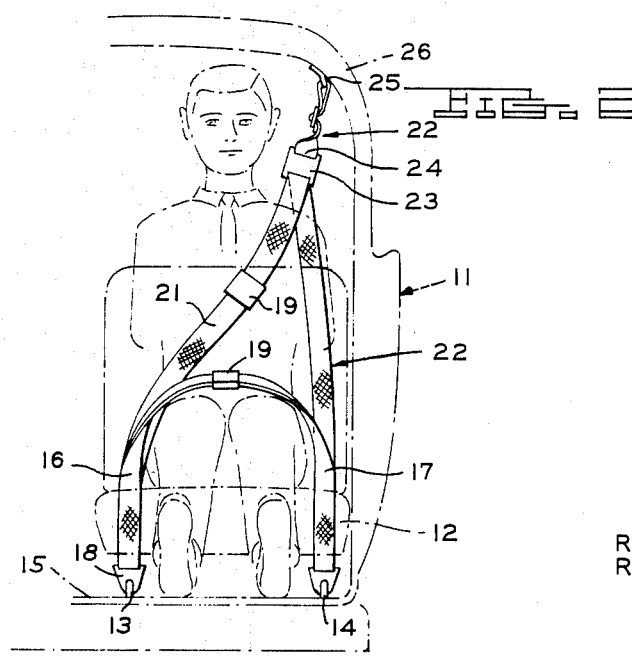

Other objects and advantages of this invention will become more apparent when considered in connection with the accompanying drawing in which:

FIGS. 1 and 2 are a side view and a front view, respectively, of a vehicle occupant restrained by a harness system according to the present invention.

For purposes of illustration, there is shown in dot and dash outline a vehicle body, generally designated 11, having a bucket-type front seat 12. Conventional belt anchorages 13 and 14 are shown secured to the vehicle floor 15 at the rear corners of the seat.

The vehicle occupant is shown wearing a conventional lap belt which comprises two belt sections 16 and 17. One end of the belt section 16 is coupled by a conventional coupling device 18 to the floor anchorage 13. Similarly, one end of the belt section 17 is coupled by a conventional coupling device 18 to the belt anchorage 14. The two belt sections are adapted to be coupled to each other at the center of the occupant's body through a conventional buckle device generally designated 19.

In addition to the lap belt, a diagonal harness strap generally designated 21 is also used to restrain the seat occupant. The harness strap 21 is attached at one end to the seat belt inboard floor anchor 13, crosses the chest of the seat occupant to an adjustable webbing sling 22 located slightly above and rearwardly of the outboard shoulder of the seat occupant. This webbing sling 22 consists of a slotted fitting 23 on a loop 24 of webbing suspended from eyebolt anchor 25 in the roofside rail 26. The shoulder strap passes through the slotted fitting and attaches to the floor anchor 14 behind the front seat. The shoulder strap is preferably in two sections which are adapted to be coupled to each other by a conventional buckling device 19.

With the arrangement shown, the support for the shoulder strap is provided by the roof structure of the vehicle body and is independent of the existence or position of roof support pillars.

Tests have shown that under severe collision conditions, occupant displacement is better controlled and the injury potential probably is reduced when the lap belt is independent of the shoulder strap as disposed in the present application.

It will be understood that the invention is not to be limited to the exact construction shown and described, but that various changes and modifications may be made without departing from the spirit and scope of the invention, as defined in the appended claims.

We claim:
In a vehicle body having a floor, a seat mounted on said floor, and a roof side rail spaced above said seat; anchor devices located on said floor at respectively opposite rear corners of a passenger occupiable portion of said seat,
a further anchor device secured to said roof side rail rearwardly of said seat portion,
a lap belt constructed and arranged to extend from one floor anchor device to the other floor anchor device across the pelvic region of an occupant of said seat portion,
adjustable sling means secured at one end thereof to said roof side rail anchor device and depending freely therefrom, said sling means at its end having a slotted fitting,
and a diagonal harness strap constructed and arranged to extend from said one floor anchor device upwardly across the chest of an occupant of said seat portion through said sling means slotted fitting and then downwardly to the other of said floor anchor devices.

References Cited by the Examiner
UNITED STATES PATENTS

| | | | |
|---|---|---|---|
| 2,705,586 | 4/1955 | Young | 280—150 X |
| 2,710,649 | 6/1955 | Griswold | 280—150 X |
| 2,804,313 | 8/1957 | Gilles | 280—150 X |
| 2,825,581 | 3/1958 | Knight | 297—389 |
| 2,864,437 | 12/1958 | Spring | 280—150 X |
| 2,898,976 | 8/1959 | Barecki | 280—150 X |
| 3,043,625 | 6/1962 | Bohlin | 297—389 |
| 3,083,035 | 3/1963 | Ottosson | 280—150 |

FOREIGN PATENTS

| | | |
|---|---|---|
| 930,802 | 6/1963 | Great Britain. |
| 1,277,656 | 10/1961 | France. |

BENJAMIN HERSH, Primary Examiner.
LEO FRIAGLIA, Examiner.